United States Patent
Nishida et al.

(10) Patent No.: US 11,367,885 B2
(45) Date of Patent: Jun. 21, 2022

(54) FUEL CELL SYSTEM

(71) Applicant: TOYOTA JIDOSHA KABUSHIKI KAISHA, Toyota (JP)

(72) Inventors: Yusuke Nishida, Nisshin (JP); Masashi Toida, Nagoya (JP); Tomotaka Ishikawa, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/221,023

(22) Filed: Apr. 2, 2021

(65) Prior Publication Data
US 2021/0359316 A1    Nov. 18, 2021

(30) Foreign Application Priority Data

May 15, 2020   (JP) .............................. JP2020-086262

(51) Int. Cl.
| | |
|---|---|
| *H01M 8/04* | (2016.01) |
| *H01M 8/04537* | (2016.01) |
| *H01M 8/04791* | (2016.01) |
| *H01M 8/04119* | (2016.01) |
| *H01M 8/04302* | (2016.01) |

(52) U.S. Cl.
CPC ... *H01M 8/04589* (2013.01); *H01M 8/04164* (2013.01); *H01M 8/04302* (2016.02); *H01M 8/04791* (2013.01); *H01M 2250/20* (2013.01)

(58) Field of Classification Search
CPC ......... H01M 8/04164; H01M 8/04302; H01M 8/04589; H01M 8/04791
USPC ....................................................... 429/431
See application file for complete search history.

(56) References Cited

U.S. PATENT DOCUMENTS

| | | | | |
|---|---|---|---|---|
| 2007/0087241 A1* | 4/2007 | Mulvenna | ......... | H01M 8/04067 429/444 |
| 2009/0269635 A1* | 10/2009 | Muramatsu | ....... | H01M 8/04343 429/515 |
| 2011/0086283 A1* | 4/2011 | Lerner | .............. | H01M 8/04302 429/429 |
| 2013/0089801 A1* | 4/2013 | Takeshita | .......... | H01M 8/04104 429/446 |
| 2014/0072893 A1* | 3/2014 | Moses | ............... | H01M 8/04798 429/432 |

(Continued)

FOREIGN PATENT DOCUMENTS

| | | | | |
|---|---|---|---|---|
| DE | 112018001426 T5 * | 12/2019 | ............. | B01D 53/22 |
| JP | 2019079656 A | 5/2019 | | |

*Primary Examiner* — James M Erwin
(74) *Attorney, Agent, or Firm* — Dickinson Wright, PLLC

(57) ABSTRACT

A fuel cell system herein may include a battery configured to supply electric power to a fuel cell auxiliary device used for activating a fuel cell stack. When remaining electric energy in the battery is higher than an electric energy threshold upon activation of the fuel cell stack, a controller of the fuel cell system may start outputting current from the fuel cell stack after a fuel concentration in the fuel cell stack reaches a predetermined fuel concentration threshold, and when the remaining electric energy decreases below the electric energy threshold while the fuel concentration is being increased, the controller may start outputting current from the fuel cell stack regardless of the fuel concentration in the fuel cell stack. The current can be obtained from the fuel cell stack even when the remaining electric energy in the battery is low.

4 Claims, 3 Drawing Sheets

(56) References Cited

U.S. PATENT DOCUMENTS

2020/0036023 A1* 1/2020 Ogawa .................. B60L 58/40

* cited by examiner

FUEL CELL SYSTEM

CROSS-REFERENCE TO RELATED APPLICATION

This application claims priority to Japanese Patent Application No. 2020-086262 filed on May 15, 2020, the contents of which are hereby incorporated by reference into the present application.

TECHNICAL FIELD

The teaching disclosed herein relates to a fuel cell system.

BACKGROUND

A fuel cell system uses several electric devices for activating a fuel cell stack (such as in Japanese Patent Application Publication No. 2019-079656). Examples of such electric devices include an electromagnetic valve, an air compressor for supplying air into the fuel cell stack, an injector for supplying high-pressure fuel gas to the fuel cell stack, and a controller for controlling the aforementioned devices. In the disclosure herein, electric devices used for activating a fuel cell stack will collectively be termed fuel cell auxiliary devices. The fuel cell system includes a battery, and upon activation of the fuel cell stack, the battery supplies electric power to the fuel cell auxiliary devices.

SUMMARY

In order to improve power generation efficiency of a fuel cell stack, a fuel concentration (hydrogen concentration) in the fuel cell stack needs to be increased above a predetermined fuel concentration threshold. On the other hand, actuators such as an air compressor and an injector consume a large amount of electric power. When remaining electric energy of a battery is low, the air compressor and the injector may not be operated sufficiently, which may result in a case in which a normal activation condition (fuel concentration condition) of the fuel cell stack is not satisfied.

A fuel cell system disclosed herein may comprise a fuel cell stack, at least one fuel cell auxiliary device, a battery, and a controller. As aforementioned, the fuel cell auxiliary device refers to an electric device used for activating the fuel cell stack. The battery may be configured to supply electric power to the fuel cell auxiliary device. When the controller activates the fuel cell stack, the controller may be configured to: when remaining electric energy in the battery is higher than an electric energy threshold, start outputting current from the fuel cell stack after a fuel concentration in the fuel cell stack reaches a predetermined fuel concentration threshold; and when the remaining electric energy decreases below the electric energy threshold while the fuel concentration is being increased, the controller is configured to start outputting current from the fuel cell stack regardless of the fuel concentration. In a case where the remaining electric energy of the battery is low, the fuel cell system disclosed herein starts outputting the current before the fuel concentration reaches the fuel concentration threshold. Since power consumption of the fuel cell auxiliary device can thereby be reduced, the fuel stack can be activated (start outputting the current) even when the remaining electric energy of the battery is low.

When the fuel cell system includes a gas-liquid separator configured to separate residual fuel gas from exhausted gas exhausted from the fuel cell stack and a pump configured to return the residual fuel gas separated by the gas-liquid separator to the fuel cell stack, the controller may be configured to execute the following processes. The controller may be configured to start outputting current from the fuel cell stack without operating the pump when the remaining electric energy decreases below the electric energy threshold while the fuel concentration is being increased. Returning the residual fuel gas to the fuel cell stack using the pump would normally increases power generation efficiency. However, exhausted gas contains impurity gas (nitrogen gas). If the pump is activated, the nitrogen gas would also circulate, which increases nitrogen gas in the fuel cell stack. If the impurity gas increases as such in addition to the fuel concentration being lower than a normal operating level, the power generation efficiency would further be decreased. A decrease in the fuel concentration can be mitigated by not activating the pump when the fuel concentration in the fuel cell stack is low.

Further, not activating the pump can reduce power consumption when the remaining electric energy of the battery is low. The remaining electric energy of the battery can swiftly be recovered by the electric power outputted from the fuel cell stack.

The controller may activate the pump when the fuel concentration exceeds the predetermined fuel concentration threshold. The power generation efficiency can be increased by activating the pump when the fuel concentration has recovered to a proper concentration and returning the residual fuel gas to the fuel cell stack.

When the remaining electric energy is low, the controller may be configured to start outputting current from the fuel cell stack regardless of not only the fuel concentration but also an oxygen concentration.

Details and further improvements of the technique disclosed herein will be described in Detailed Description below.

DETAILED DESCRIPTION

Figure 1:
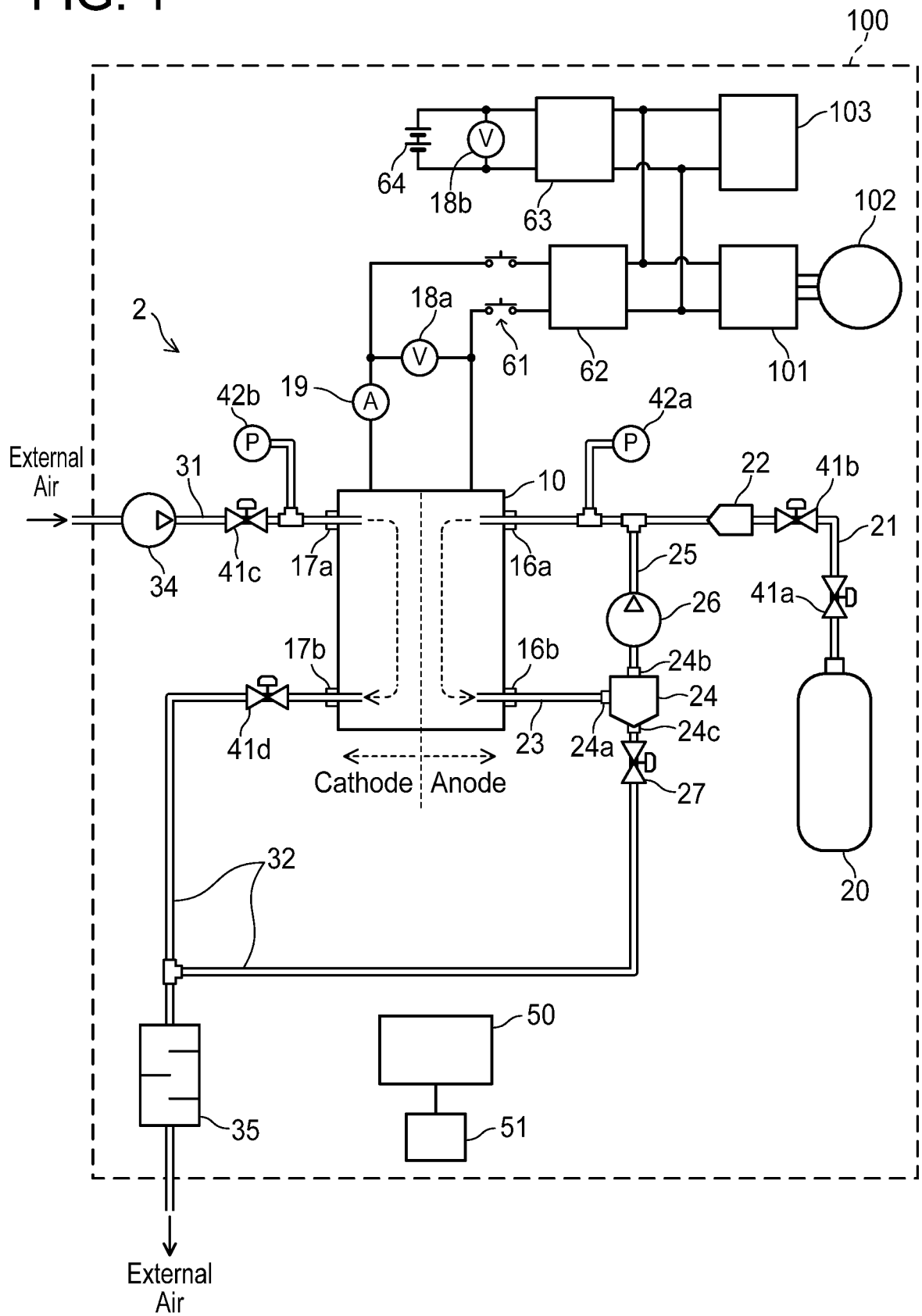
FIG. 1 is a block diagram of a fuel cell vehicle including a fuel cell system of an embodiment.

A fuel cell system 2 of an embodiment will be described with reference to the drawings. The fuel cell system 2 is mounted in a fuel cell vehicle 100. FIG. 1 shows a block diagram of the fuel cell vehicle 100 including the fuel cell system 2. The fuel cell vehicle 100 is configured to travel by obtaining electric power from the fuel cell system 2 and using an electric traction motor 102. Output electric power from the fuel cell stack 10 is stepped up by a step-up converter 62, thereafter converted to AC power in an inverter 101, and supplied to the electric traction motor 102. A main battery 103 is also connected to output terminals of the step-up converter 62. Of the electric power generated by the fuel cell stack 10, electric power that was not consumed by the electric traction motor 102 is charged in the main battery 103. Since the fuel cell stack 10 has a long time constant of change in the output electric power, electric power from the main battery 103 is used to increase responsiveness to a change in electric power supplied to the electric traction motor 102.

A step-down converter 63 is also connected to the output terminals of the step-up converter 62. A sub battery 64 is connected to output terminals of the step-down converter 63. A part of the output electric power from the fuel cell stack 10 is stepped down in the step-down converter 63 and charges the sub battery 64.

An output voltage of the main battery 103 is higher than 100 volts. An output voltage of the sub battery 64 is lower than 50 volts. Electric power from the main battery 103 is supplied to the electric traction motor 102. Electric power from the sub battery 64 is supplied to devices that operate at a voltage that is less than 50 volts. Such devices that operate on the electric power from the sub battery 64 include various controllers (computers) and low-power devices such as a navigation system.

The sub battery 64 supplies the electric power also to fuel cell auxiliary devices of the fuel cell system 2. The term "fuel cell auxiliary devices" is a collective term for electric devices used for activating and driving the fuel cell stack 10. The fuel cell auxiliary devices include valves 41a to 41d, an injector 22, a pump 26, an air compressor 34, and a controller 50. These fuel cell auxiliary devices will be described later.

The fuel cell system 2 includes the fuel cell stack 10 and a fuel tank 20. Hereinbelow, the fuel cell stack 10 may be denoted as FC stack 10 to simplify the explanation.

The FC stack 10 is an assembly of multiple fuel cells. As it is well known, each of the fuel cells is separated into an anode side and a cathode side with an electrolyte film interposed therebetween. Fuel gas is supplied to the anode side through an anode gas inlet 16a. Air is supplied to the cathode side through a cathode gas inlet 17a. Hydrogen contained in the fuel gas is ionized, reacts with oxygen contained in the air from the cathode side, and electricity is thereby generated. Since a chemical reaction in the fuel cells (FC stack 10) is well known, detailed description thereof will be omitted.

The fuel gas that was not used in the chemical reaction and impurities generated in the chemical reaction are discharged from an anode gas outlet 16b. Gas (exhausted gas) discharged from the anode gas outlet 16b may be termed fuel off gas. Generated water and the air (oxygen) that was not used are discharged from a cathode gas outlet 17b.

Equipment on a fuel gas side of the fuel cell system 2 will be described. As the equipment for feeding the fuel gas to the anode side of the FC stack 10, the fuel cell system 2 includes a fuel supply pipe 21, the injector 22, a gas exhaust pipe 23, a gas-liquid separator 24, a return pipe 25, a pump 26, and a gas and water discharge valve 27.

The fuel supply pipe 21 connects the fuel tank 20 with the FC stack 10. Two valves 41a, 41b, the injector 22, and a pressure sensor 42a are connected to the fuel supply pipe 21. The valve 41a is a main stop valve and is configured to stop discharge of fuel gas from the fuel tank 20 while the fuel cell system 2 is not operating. The valve 41b is a regulator valve and is configured to regulate a pressure of the fuel gas supplied to the injector 22. The injector 22 is configured to increase the pressure of the fuel gas and supply the same to the FC stack 10. The pressure sensor 42a is disposed between the injector 22 and the fuel cell stack 10, and is configured to measure the pressure of the fuel gas supplied to the FC stack 10.

One end of the fuel supply pipe 21 is connected to the anode gas inlet 16a of the FC stack 10 and is configured to supply the fuel gas to the anode side of the FC stack 10. One end of the gas exhaust pipe 23 is connected to the anode gas outlet 16b, and another end of the gas exhaust pipe 23 is connected to a gas inlet 24a of the gas-liquid separator 24.

The exhausted gas discharged from the anode gas outlet 16b of the FC stack 10 contains unreacted fuel gas. The exhausted gas from the FC stack 10 reaches the gas-liquid separator 24 through the gas exhaust pipe 23. The gas-liquid separator 24 is configured to separate the exhausted gas discharged from the anode gas outlet 16b into hydrogen gas (residual fuel gas) and impurities. Typical examples of the impurities separated from the exhaust gas in the gas-liquid separator 24 are nitrogen gas and water. Nitrogen contained in the air supplied to the cathode side reaches the anode side by passing through the electrolyte film, which result in the nitrogen gas. The residual fuel gas is discharged from a gas outlet 24b and the impurities are discharged from an impurity discharging outlet 24c. A part of impurity gas (nitrogen gas) is discharged from the gas outlet 24b with the residual fuel gas.

One end of the return pipe 25 is connected to the gas outlet 24b of the gas-liquid separator 24, and another end of the return pipe 25 is connected to the fuel supply pipe 21. The pump 26 is mounted on the return pipe 25. The pump 26 is configured to return the residual fuel gas separated from the exhaust gas in the gas-liquid separator 24 to the FC stack 10 through the return pipe 25 and the fuel supply pipe 21.

The gas and water discharge valve 27 is connected to the impurity discharging outlet 24c of the gas-liquid separator 24. An exhaust pipe 32 is connected to an outlet of the gas and water discharge valve 27. When the gas and water discharge valve 27 opens, the impurities separated from the exhausted gas in the gas-liquid separator 24 are discharged into the exhaust pipe 32.

Equipment on an air-supply side of the fuel cell system 2 will be described. As the equipment for supplying the air (oxygen) to the cathode side of the FC stack 10, the fuel cell system 2 includes an air supply pipe 31, an air compressor 34, and valves 41c, 41d.

One end of the air supply pipe 31 is connected to the cathode gas inlet 17a of the FC stack 10 and another end thereof is opened to the external air. The air compressor 34, the valve 41c, and a pressure sensor 42b are provided on the air supply pipe 31. The air compressor 34 is configured to compress the external air and supply the compressed air to the cathode side of the FC stack 10 through the air supply pipe 31. The exhaust pipe 32 is connected to the cathode gas outlet 17b of the FC stack 10. The valve 41d is provided on the exhaust pipe 32. The valve 41c and the valve 41d are regulator valves, which are configured to regulate a pressure of the air supplied to the FC stack 10. The pressure sensor 42b is connected between the valve 41c and the fuel cell stack 10. The pressure sensor 42b is configured to measure the pressure of the air supplied to the FC stack 10.

The exhaust pipe 32 is connected to the outlet of the gas and water discharge valve 27 and the cathode gas outlet 17b. Exhausted air discharged from the cathode gas outlet 17b of the FC stack 10 and the impurity gas discharged from the outlet of the gas and water discharge valve 27 are mixed in the exhaust pipe 32 and the mixture thereof is discharged from the exhaust pipe 32 to the external air. A muffler 35 is connected to a downstream portion of the exhaust pipe 32. The exhausted gas (mixture gas of the exhausted air and the impurity gas) is discharged to the external air through the muffler 35. The water generated in the fuel cell stack 10 is also discharged outside the vehicle through the exhaust pipe 32 and the muffler 35.

The fuel cell system 2 includes pressure sensor(s), concentration sensor(s), and/or flow rate sensor(s) at various positions aside from the pressure sensors 42a, 42b, although they are omitted from the drawings. A voltage sensor 18a and a current sensor 19 are connected to an output terminal of the FC stack 10. The current sensor 19 is configured to measure current outputted from the FC stack 10 and the voltage sensor 18a is configured to measure an output voltage of the FC stack 10. Measured values of these sensors are sent to the controller 50.

The controller 50 is configured to control the output current and the output voltage of the FC stack 10 by controlling an output voltage of the step-up converter 62.

The step-up converter 62 is connected to an electrode of the FC stack 10 via a FC relay 61. As aforementioned, the electric power generated by the FC stack 10 (fuel cell system 2) is stepped up by the step-up converter 62 and supplied to the inverter 101 or the main battery 103. Further, a part of the electric power from the FC stack 10 is stepped down by the step-down converter 63 and charges the sub battery 64.

The controller 50 controls the injector 22, the pump 26, the valves 41a to 41e (electromagnetic valves), the gas and water discharge valve 27, the air compressor 34, the FC relay 61, the step-up converter 62, the step-down converter 63, and the inverter 101. These devices are connected to the controller 50 by signal lines, however, depiction of the signal lines is omitted in FIG. 1. The fuel cell auxiliary devices include the injector 22, the pump 26, the valves 41a to 41e, the gas and water discharge valve 27, the air compressor 34, the FC relay 61, the step-up converter 62, the step-down converter 63, and the controller 50. These fuel cell auxiliary devices are supplied with electric power from the sub battery 64. In FIG. 1, depiction of power lines connecting the fuel cell auxiliary devices to the sub battery 64 is also omitted.

An activation process of the FC stack 10 will be described. The controller 50 drives the air compressor 34 and feeds the air to the FC stack 10. The controller 50 drives the injector 22 and feeds the fuel gas (hydrogen gas) to the FC stack 10. The chemical reaction is initiated once the fuel (hydrogen) and the air (oxygen) are supplied to the FC stack 10, as a result of which electrons are generated in the anode side. When the controller 50 closes the FC relay 61 and activates the step-up converter 62, the current is outputted from the FC stack 10 through the step-up converter 62. That is, by activating the step-up converter 62, the current starts to be outputted from the fuel cell system 2 (FC stack 10).

In order to generate the electric power efficiently, the controller 50 starts outputting the current after each of a fuel concentration and an oxygen concentration in the FC stack 10 has reached its threshold concentration. The fuel concentration is correlated with the pressure of the fuel gas supplied to the FC stack 10. The controller 50 estimates the fuel concentration in the FC stack 10 based on the value measured by the pressure sensor 42a (that is, the pressure of the fuel gas supplied to the FC stack 10). The oxygen concentration is correlated with a pressure of the air supplied to the FC stack 10. The controller 50 estimates the oxygen concentration in the FC stack 10 based on the value measured by the pressure sensor 42b (that is, the pressure of the air supplied to the FC stack 10). When the estimated fuel concentration reaches a predetermined fuel concentration threshold and the estimated oxygen concentration reaches a predetermined oxygen concentration threshold, the controller 50 activates the step-up converter 62 and starts outputting the current.

The fuel concentration is increased by the injector 22 and the oxygen concentration is increased by the air compressor 34. The injector 22 and the air compressor 34 are actuators and consume large amounts of electricity. As aforementioned, the injector 22 and the air compressor 34 are supplied with the power from the sub battery 64. When the remaining electric energy in the sub battery 64 is low, the injector 22 and the air compressor 34 may not be operated over a long period of time, and thus, the fuel concentration and the oxygen concentration in the FC stack 10 may not be increased to their concentration thresholds. When the remaining electric energy of the sub battery 64 decreases below a predetermined electric energy threshold while the controller 50 is increasing the fuel concentration and the oxygen concentration, the controller 50 starts outputting the current even if one of or both of the fuel concentration and the oxygen concentration have not reached their concentration thresholds.

Figure 2:
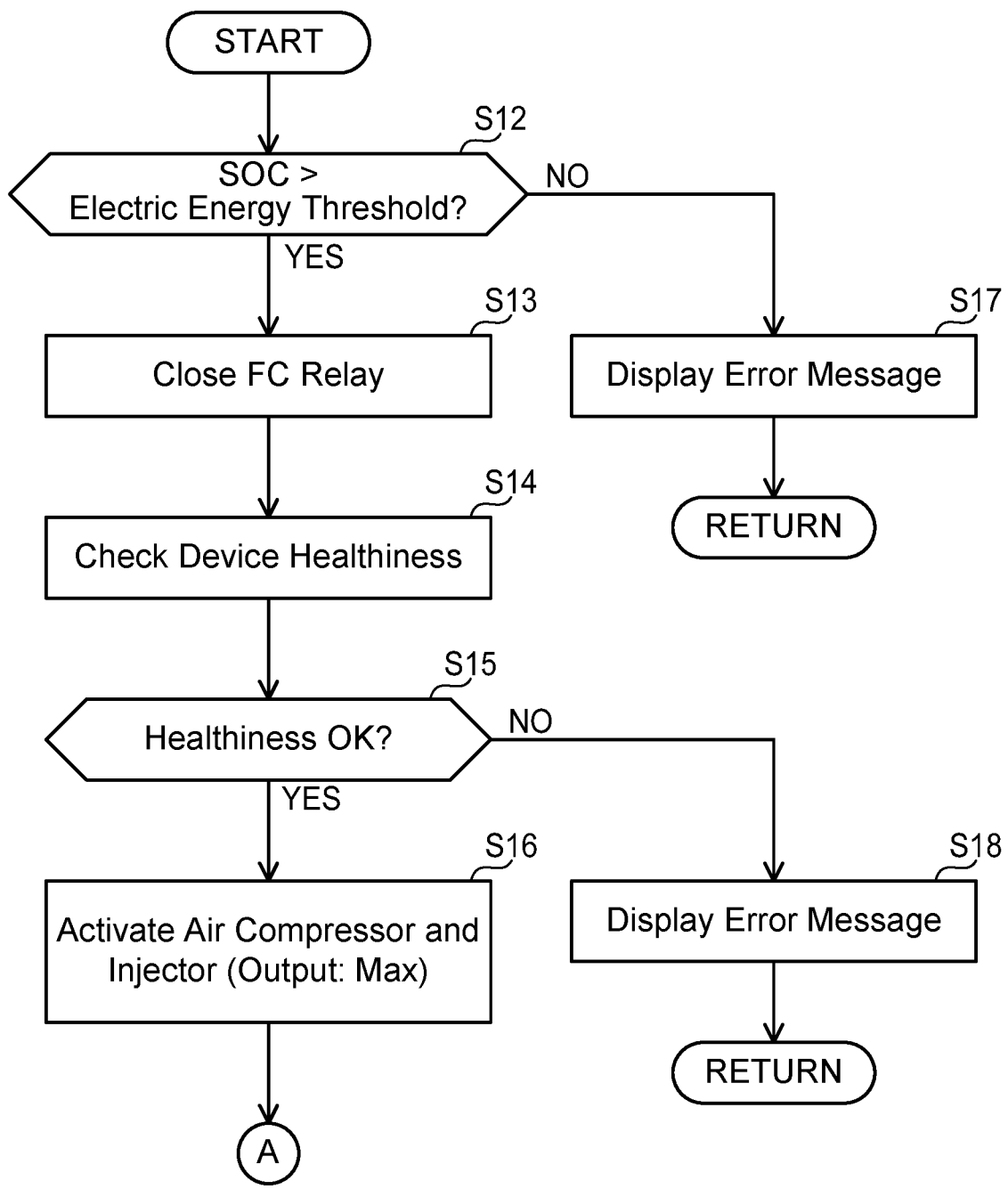
FIG. 2 is a flowchart of an activation process of a fuel cell stack.
Figure 3:
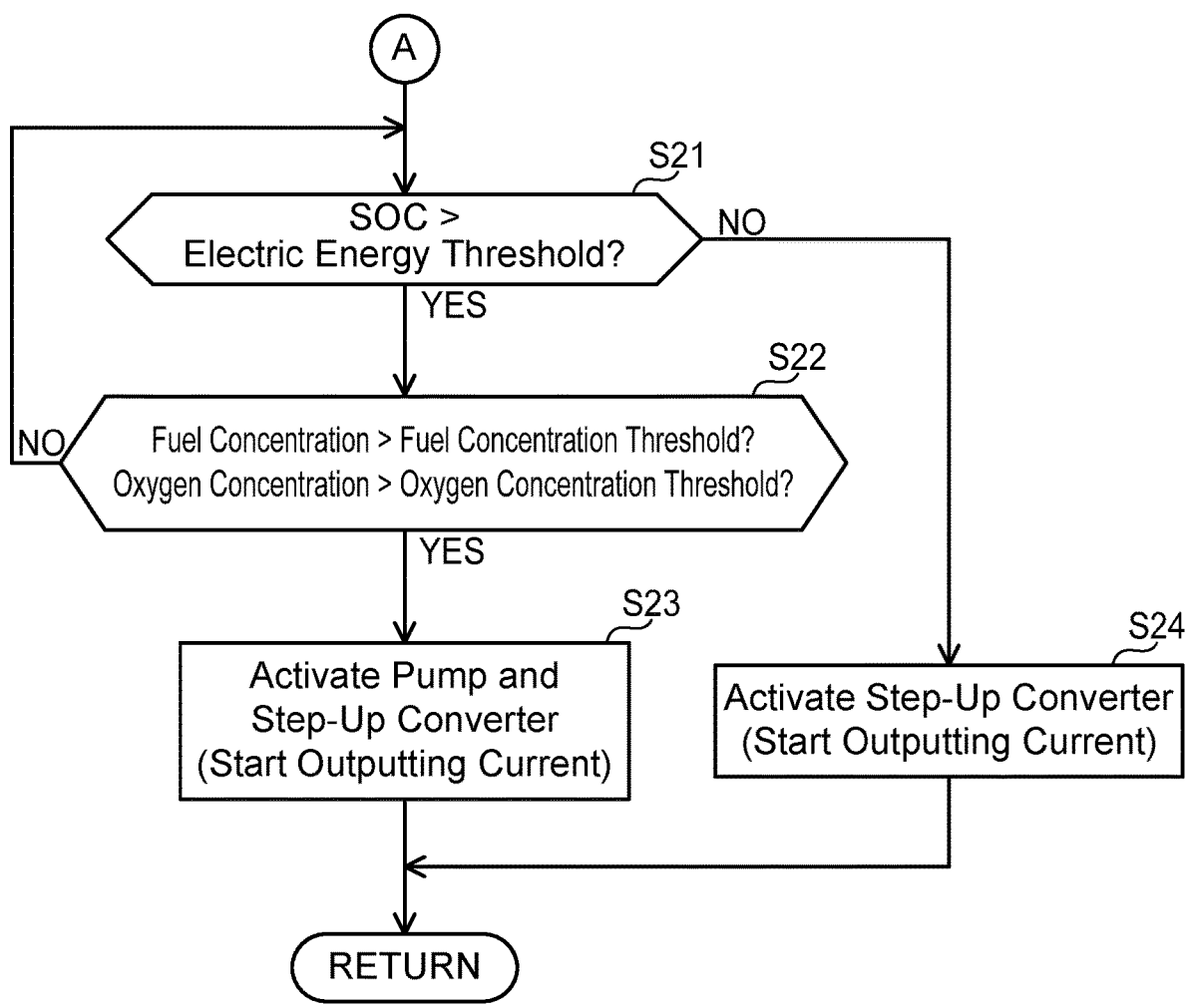
FIG. 3 is a flowchart of the activation process of the fuel cell stack (continuation of FIG. 2).

FIGS. 2 and 3 show flowcharts of the activation process of the FC stack 10 executed by the controller 50. The activation process will be described with reference to FIGS. 2 and 3. The activation process of FIGS. 2 and 3 is initiated when a start switch of the fuel cell vehicle 100 is turned on.

In the following description and in FIGS. 2 and 3, the remaining electric energy in the sub battery 64 will be represented by "SOC" (State Of Charge). The fuel cell system 2 includes a voltage sensor 18b configured to measure the output voltage of the sub battery 64 (FIG. 1), and the controller 50 is configured to estimate the SOC of the sub battery 64 from the output voltage of the sub battery 64 measured by the voltage sensor 18b.

When the start switch of the fuel cell vehicle 100 is turned on, the controller 50 compares the SOC of the sub battery 64 with an electric energy threshold (S12). If the SOC of the sub battery 64 is below the electric energy threshold before starting the activation process, the activation process cannot be executed at all, thus the controller 50 displays an error message indicating that the FC stack 10 cannot be activated due to the SOC of the sub battery 64 being too low, and terminates the process (step S12: NO, S17). An instrumental panel 51 is connected to the controller 50 (FIG. 1), and the controller 50 displays the error message on the instrumental panel 51.

In a case where the SOC is higher than the electric energy threshold at the beginning of the activation process (step S12: YES), the controller 50 closes the FC relay 61 (step S13). When the controller 50 closes the FC relay 61, the FC stack 10 is connected to a traction system of the vehicle such as the inverter 101 and the electric traction motor 102.

Next, the controller 50 checks device healthiness (step S14). Devices checked in step S14 include the fuel cell auxiliary devices and devices related to traction (such as the inverter 101 and the electric traction motor 102). The controller 50 inspects abnormality in those devices. If abnormality is detected in one of the devices, the controller 50 displays an error message indicating that the abnormality has been detected and terminates the process (step S15: NO, S18).

In a case where the healthiness is OK (step S15: YES), the controller 50 opens the valve 41a and activates the injector 22 and the air compressor 34 (step S16). At this occasion, the controller 50 increases the fuel concentration and the oxygen concentration in the fuel cell stack 10 by driving the injector 22 and the air compressor 34 at their maximum outputs and controlling the valves 41b to 41d.

When the fuel concentration in the fuel cell stack 10 exceeds the fuel concentration threshold and the oxygen concentration therein exceeds the oxygen concentration threshold, the controller 50 activates the pump 26 and the step-up converter 62 (step S22: YES, S23). When the step-up converter 62 is activated, the current starts to be outputted from the fuel cell stack 10. Further, by activating the pump 26, the residual fuel gas contained in the exhausted gas is returned to the fuel cell stack 10. Returning the residual fuel gas to the fuel cell stack 10 improves power generation efficiency.

While increasing the fuel concentration and the oxygen concentration in the fuel cell stack 10, the controller 50 monitors the SOC of the sub battery 64 (step S21). When the SOC becomes lower than the electric energy threshold while the fuel concentration and the oxygen concentration in the fuel cell stack 10 are being increased (step S21: NO), the controller 50 activates the step-up converter 62 regardless of whether one of or both of the fuel concentration and the oxygen concentration have not reached their concentration thresholds, and starts outputting the current from the fuel cell stack 10 (step S24).

Upon executing step S24, the controller 50 activates the step-up converter 62 without activating the pump 26. The controller 50 monitors the fuel concentration and the oxygen concentration even after having activated the step-up converter 62 in step S24, although this process is omitted from the drawings. When both the fuel concentration and the oxygen concentration reach their concentration thresholds after the step-up converter 62 has been activated without activation of the pump 26, the controller 50 activates the pump 26. Once both the fuel concentration and the oxygen concentration reached their concentration thresholds, the controller 50 controls the injector 22, the air compressor 34, and the valves 41*b* to 41*d* so that both the fuel concentration and the oxygen concentration maintain values exceeding their concentration thresholds.

When the current output from the step-up converter 62 is started, the controller 50 activates the step-down converter 63 and charges the sub battery 64 with the electric power from the fuel cell stack 10. Further, when the current output from the step-up converter 62 is started, the fuel cell vehicle 100 is ready to travel.

Advantages of the activation process of the embodiment will be described. When the SOC of the sub battery 64 becomes lower than the electric energy threshold while the controller 50 is increasing the fuel concentration and the oxygen concentration, the controller 50 activates the step-up converter 62 regardless of whether the fuel concentration and/or the oxygen concentration have not reached their concentration thresholds, and starts the current output. Due to this, the fuel cell vehicle 100 can start to travel even when the SOC of the sub battery 64 is low.

When the SOC is lower than the electric energy threshold, the controller 50 activates the step-up converter 62 without activating the pump 26. The exhausted gas contains, in addition to fuel, the impurity gas such as nitrogen. The impurities are separated from the exhausted gas by the gas-liquid separator 24, however, a part thereof is returned to the fuel cell stack 10 along with the residual fuel gas. When the SOC is low, the current output is started with a low fuel concentration. When the impurity gas increases in addition to the fuel concentration being lower than its normal operating level, the fuel concentration would further decrease. Such further decrease of the fuel concentration can be prevented by not activating the pump 26 when the fuel concentration of the fuel cell stack 10 is low.

Further, not activating the pump 26 can save the remaining electric energy in the sub battery 64.

Some notes related to the art described in the embodiment will be given. When the SOC of the sub battery 64 exceeds the electric energy threshold, the controller 50 of the fuel cell system 2 starts outputting the current after the fuel concentration and the oxygen concentration in the fuel cell stack 10 reach their predetermined concentration thresholds. The fuel concentration is correlated with the pressure of the fuel gas supplied to the fuel cell stack 10 and the oxygen concentration is correlated with the pressure of the air supplied to the fuel cell stack 10. Due to this, the "fuel concentration" in the embodiment is equivalent to "the pressure of the fuel gas supplied to the fuel cell stack", and the "oxygen concentration" therein is equivalent to "the pressure of the air supplied to the fuel cell stack".

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A fuel cell system comprising:
a fuel cell stack;
a fuel cell auxiliary device used for activating the fuel cell stack;
a battery configured to supply electric power to the fuel cell auxiliary device; and
a controller configured to activate the fuel cell stack,
wherein when the controller activates the fuel cell stack, the controller is configured to:
when remaining electric energy in the battery is higher than an electric energy threshold, start outputting current from the fuel cell stack after a fuel concentration in the fuel cell stack reaches a predetermined fuel concentration threshold; and
when the remaining electric energy decreases below the electric energy threshold while the fuel concentration is being increased, start outputting current from the fuel cell stack regardless of the fuel concentration.

2. The fuel cell system of claim 1, further comprising:
a gas-liquid separator configured to separate residual fuel gas from exhausted gas exhausted from the fuel cell stack; and
a pump configured to return the residual fuel gas separated by the gas-liquid separator to the fuel cell stack,
wherein the controller is configured to start outputting current from the fuel cell stack without operating the pump when the remaining electric energy decreases below the electric energy threshold while the fuel concentration is being increased.

3. The fuel cell system of claim 2, wherein the controller activates the pump when the fuel concentration exceeds the predetermined fuel concentration threshold.

4. The fuel cell system of claim 1, wherein the fuel cell auxiliary device includes an injector configured to supply fuel to the fuel cell stack.

* * * * *